United States Patent [19]

Sanchez et al.

[11] Patent Number: 5,576,116

[45] Date of Patent: Nov. 19, 1996

[54] SEALED STORAGE CELL OPERATING AT LOW PRESSURE

[75] Inventors: Patrick Sanchez, Le Pian Medoc; Edith Metayer, Le Bouscat, both of France

[73] Assignee: Saft, Romainville, France

[21] Appl. No.: 598,621

[22] Filed: Feb. 12, 1996

Related U.S. Application Data

[63] Continuation of Ser. No. 187,505, Jan. 28, 1994, abandoned.

[30] Foreign Application Priority Data

Jan. 27, 1994 [FR] France ................................ 94 00885

[51] Int. Cl.⁶ .......................... H01M 10/52; H01M 4/64
[52] U.S. Cl. .......................... 429/59; 429/206; 429/223
[58] Field of Search ............................ 429/59, 57, 206, 429/223, 209, 233, 245, 94, 222

[56] References Cited

U.S. PATENT DOCUMENTS

| | | | |
|---|---|---|---|
| 2,842,607 | 7/1958 | Germershausen et al. | 429/59 |
| 3,023,258 | 2/1962 | Peter | 429/59 |
| 3,119,722 | 1/1964 | Tietze et al. | 429/59 |
| 3,438,812 | 4/1969 | Cherney et al. | |
| 4,038,641 | 7/1977 | Warnock | |
| 4,900,642 | 2/1990 | Tomantschger et al. | 429/59 |
| 5,122,426 | 6/1992 | Simon et al. | 429/59 |

FOREIGN PATENT DOCUMENTS

| | | |
|---|---|---|
| 416244A2 | 3/1991 | European Pat. Off. |
| 0552441A1 | 7/1993 | European Pat. Off. |
| 1243784 | 9/1960 | France |
| 3929306A1 | 3/1991 | Germany |

OTHER PUBLICATIONS

Patent Abstracts of Japan, vol. 13, No. 280 (E–779) (3628) 27 Jun. 1989 & JP-A-01 067 876 (Matsushita Electric Lind Co., Ltd.).

Patent Abstracts of Japan, vol. 10, No. 117 (E–400) (2174) 2 May 1986 & JP-A-60 250 567 (Yuasa Denchi K.K.).

*Primary Examiner*—Anthony Skapars
*Attorney, Agent, or Firm*—Sughrue, Mion, Zinn, Macpeak & Seas

[57] ABSTRACT

An electrochemical cell has an alkaline electrolyte comprising a stack placed in a container and composed of at least one anode and at least one cathode containing nickel hydroxide. An oxygen recombination system has at least one recombination electrode which is at least partially hydrophobic and has two opposite faces of large surface area. A first face is joined to the anode. The cell is characterized in that the recombination electrode is associated with a rigid structure which forms, in contact with the second face of the electrode, a nonreducible volume space of small width so as to allow oxygen access throughout the duration of use of the cell.

15 Claims, 4 Drawing Sheets

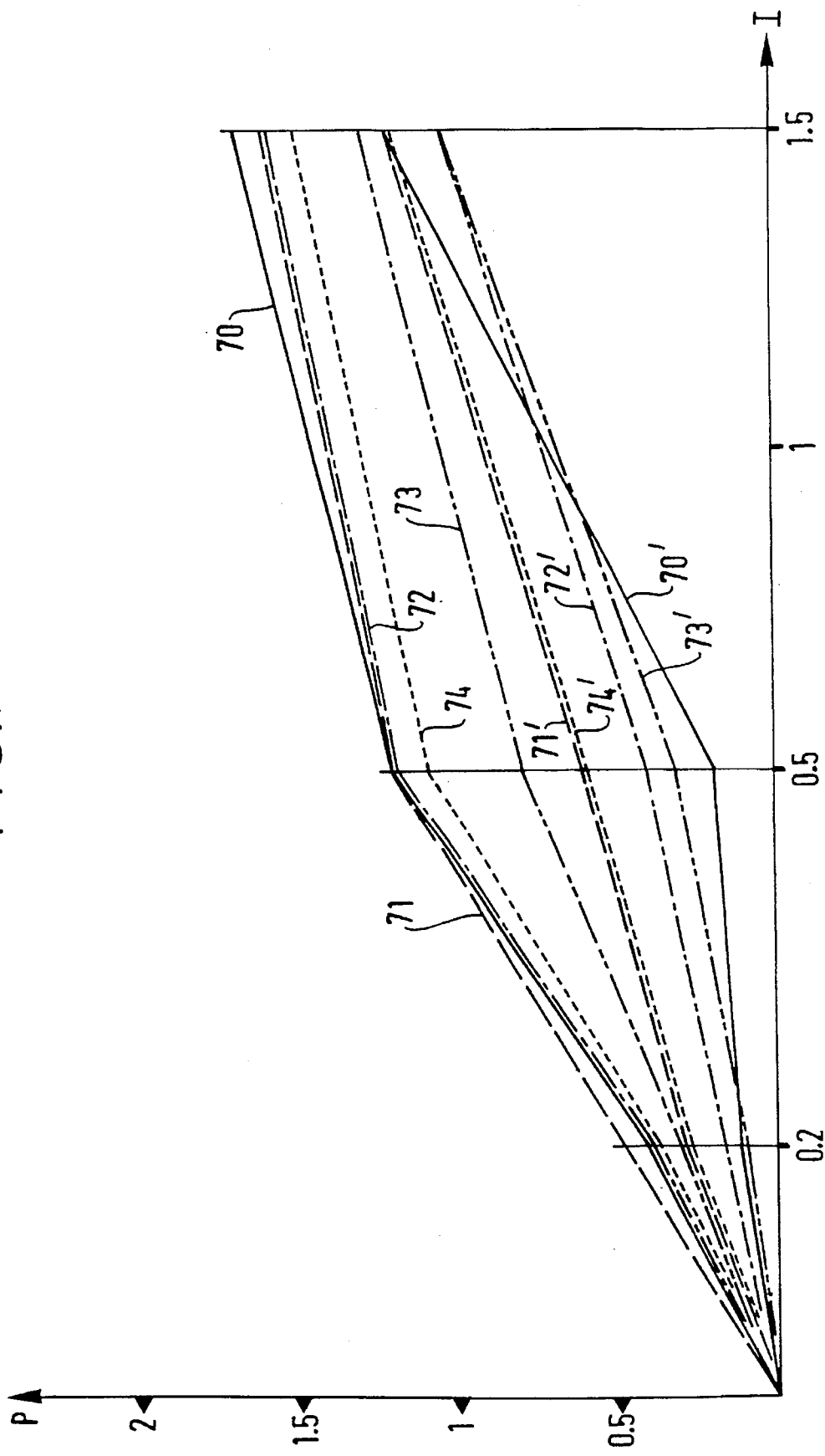

SEALED STORAGE CELL OPERATING AT LOW PRESSURE

This is a Continuation of Application No. 08/187,505 filed Jan. 28, 1994, now abandoned.

The present invention relates to a secondary electrochemical cell having an aqueous electrolyte that is maintenance-free. It is more particularly applicable to sealed storage cells having alkaline aqueous electrolyte.

The operation of unsealed storage cells having alkaline aqueous electrolyte gives rise to reactions that evolve gases, respectively oxygen at the positive electrode or cathode and hydrogen at the negative electrode or anode, resulting in consumption of water. In order to avoid successive topping-up of the electrolyte level during periods of operation, it is preferable to use storage cells with maintenance-free electrolyte, i.e. "sealed" storage cells. In this type of storage cell, the evolution of hydrogen during the overcharge period is avoided by using an incompletely-charged negative electrode with excess capacity. The oxygen formed on the positive electrode then leads to a rise in the internal pressure of the storage cell depending on the overcharging rate used. A steady state condition is then established during which the oxygen produced at the positive electrode by reaction [1] is diminished, or recombined, on the negative electrode by reaction, [2], the reaction budget being zero:

$$4OH^- \rightarrow 2H_2O + O_2 + 4e^- \quad [1]$$

$$2H_2O + O_2 + 4e^- \rightarrow 4OH^- \quad [2]$$

The recombination mechanism involves the simultaneous presence of three phases: solid (electron conductor)—liquid (water)—gas (oxygen). This can only be obtained through an equilibrium of the hydrophillic and hydrophobic properties within the negative electrode. A great deal of work has been devoted to this, relating to surface deposits (U.S. Pat. No. 4,987,041; U.S. Pat. No. 4,614,696; U.S. Pat. No. 4,826,744) or to the production of multi-layer electrodes (U.S. Pat. No. 3,385,780). However, the hydrophobic character of the negative electrode obtained by such means is generally of short duration, the number of available recombination sites is small, and as use of the storage cell continues, its internal pressure progressively rises.

Nowadays it is preferred to incorporate an auxiliary electrode into the storage cell, which auxiliary electrode is electrically connected to the negative electrode which is where recombination takes place. Such an oxygen electrode generally comprises a hydrophillic or partially hydrophobic face that is frequently catalytic, and a hydrophobic face, usually made of PTFE. A conductive layer or a current collector may be added, if necessary.

A three-layer electrode is disclosed in U.S. Pat. No. 5,122,426. It is composed of a hydrophillic layer placed between two hydrophobic layers, one of which is conductive and is electrically connected to the negative electrode. The hydrophillic layer and the non-conductive hydrophobic layer are constituted by an extremely porous non-woven structure of a synthetic material.

This idea has some disadvantages, and the internal pressure of such a storage cell will certainly increase over time. As far as the auxiliary electrode itself is concerned, production of such an electrode requires numerous steps, and the hydrophobic character of the electrode tends to disappear with time. This is due to migration of the wetting agents used in the hydrophillic layer. As a result, the distribution of the hydrophillic and hydrophobic zones is modified, which increases the absorptivity of the electrode and limits oxygen access. As for the implementation of the auxiliary electrode, breakdown of the electrode is inevitable due to the poor mechanical strength of the constituents used. It is known that the electrodes of a nickel alkaline storage cell undergo an increase of volume, often called swelling, during prolonged use of the storage cell. This swelling causes breakdown of the components of low mechanical strength, such as the separators and in this case the auxiliary electrodes.

U.K Patent No. 2 023 918 describes a two-layer auxiliary electrode constituted by a catalytic hydrophillic layer onto which a hydrophobic sheet is applied. Two electrodes are required for operation of the storage cell: they are placed as far apart as possible inside the case, and when one of them becomes soaked with electrolyte, the other can function.

The production of that electrode, which requires a plurality of steps, is not easily accomplished and the hydrophillic layer which it includes is inevitably soaked by the electrolyte which penetrates therein. Moreover, that electrode is thin and does not itself possess a structure allowing access to oxygen, and when placed in the stack of electrodes, that electrode is rapidly rendered unusable by crushing of the components which surround it.

The present invention proposes an electrochemical cell, of high energy per unit volume, operating at low pressure, which does not require maintenance, and the performance of which is maintained throughout the duration of its use.

The present invention provides an electrochemical cell having an alkaline electrolyte comprising a stack placed in a container and composed of at least one anode and at least one cathode containing nickel hydroxide, and an oxygen recombination system comprising at least one recombination electrode which is at least partially hydrophobic and has two opposite faces of large surface area, the first face being joined to said anode, the cell being characterized in that said recombination electrode is associated with a rigid structure which forms, in contact with the second face of said electrode, a nonreducible free space of small width so as to allow oxygen access throughout the duration of use of said cell.

The swelling of the electrodes of the stack takes place in a direction perpendicular to their largest surfaces. The structure must be sufficiently rigid in a direction perpendicular to the surface of the recombination electrode that the free space formed is not reduced in volume and allows easy access for the oxygen. Although the contact area between this space and the recombination electrode should be as large as possible, the volume of this space is not necessarily significant. For example, a width of 0.3 mm, obtained by using expanded nickel as the structure, is sufficient to allow enough oxygen access to ensure an acceptable internal pressure in the cell.

Said rigid structure comprises a part including projections in contact with said second face of said recombination electrode. These projections may take any shape provided that they limit the deformation of the recombination electrode. This part may be made of metal, plastics, or any other chemically inert and stable material.

In a variant, this part comprises rectilinear ribs. The rigid ribs may be parallel to the edges of the part or oblique with respect thereto, and they may also intersect. Preferably, when these ribs are arranged in parallel fashion, their spacing is such that the surface area accessible to the gas represents more than 60% of the surface area of the electrode. Their number is chosen so as to avoid any excessive deformation of the recombination electrode during operation of the storage cell.

In another variant, said part may be an expanded metal, a grid or a gauze.

An expanded metal is defined as a sheet in which short slits are cut and which is then drawn out in a direction perpendicular to these slits. A grid is defined as a rectangular lattice formed by wires or threads which are superposed and secured together, for example by melting or by gluing. A gauze is defined as a surface composed of interwoven wires, either as a weave or a knit.

Preferably, said rigid structure is hydrophobic. The hydrophobic structure guarantees that the oxygen has permanent access to the entire surface area of the electrode, as the structure does not retain electrolyte which could limit such access.

Said recombination electrode is composed of a current collector coated with a mixture of carbon, polytetrafluoroethylene (PTFE), and a bonding agent. Preferably, said mixture is composed of 40% by weight of carbon, 20% by weight of PTFE and 10% by weight of a polyester adhesive. The electrode is then merely dried.

The role of the PTFE is to provide cohesion between the carbon particles and to reinforce the hydrophobic character of the carbon. A partially hydrophobic layer can therefore be produced which may be impregnated with electrolyte without being soaked, this guaranteeing the presence of a large number of three-phase reaction sites. During the preparation of the paste, the PTFE forms fibrilla with very poor covering power, thereby minimizing the number of reaction sites which could be masked or coated; the activity of the carbon therefore remains significant.

The polyester-type adhesive breaks up the agglomerates of carbon which are formed during preparation of the paste, so that a uniform deposit is obtained on the support. It also ensures that the paste binds to the current collector without modifying its hydrophobic character.

In a first variant, said recombination electrode and said rigid structure associated with it are situated at one end of said stack of electrodes. The recombination electrode is joined to the anode placed at the end of the stack, and is electrically connected to it so as to be in contact with the electrolytic solution. This positioning allows thin films of electrolyte to be formed on the surface of the recombination electrode and therefore increases the number of recombination sites at which the three phases are reunited. The projections on the part in the rigid structure are applied to the free face of the recombination electrode so that the free space is in contact with the electrode. The portion opposite the part bears against the internal wall of the container of the storage cell which is generally of plastics material.

In a second variant, said recombination electrode and said rigid structure associated with it are situated at each end of said stack of electrodes.

Advantageously, said part is constituted by projections integral with the internal wall of said container. This allows the volume occupied by said part to be diminished without diminishing the space available for the oxygen to access the surface of each recombination electrode. For example, during fabrication of the container, projections may be produced in the form of ribs, in the part constituting the container. It is also possible to secure a gauze by appropriate means onto the internal wall of the container, this having the advantage of making the wall rigid and more easily handled.

In a third variant, said stack of electrodes is divided into sub-stacks and said recombination electrode and said rigid structure associated with it are situated at each of the ends of said sub-stacks of electrodes. Thus, the stack may comprise as many sub-stacks as desired.

Advantageously, two rigid structures placed side-by-side between two sub-stacks are constituted by a single part bearing projections on both faces. The structures associated with the recombination electrodes placed between two sub-stacks may comprises two similar parts bearing projections on one face and mounted back-to-back, or may equally well comprise a single part comprising projections on both opposed faces, forming a nonreducible free space in contact with the surface of each recombination electrode. This second solution has the advantage of diminishing the volume occupied by the structures without diminishing the free space available for the oxygen to access the surface of each recombination electrode.

In a preferred embodiment, the cell of the present invention comprises an anode containing a hydridable composition.

In another preferred embodiment, the storage cell of the present invention comprises an anode containing cadmium. In a first variant, the anode or negative electrode is constituted by a current collector of sintered nickel containing an active substance of cadmium hydroxide products. In another embodiment, the anode is constituted by a highly-porous current collector of foam, nickel fibers or a foil of nickel or nickel-plated steel which is coated with a paste containing cadmium oxide and a polymer binder. Alternatively, the anode may contain electro-deposited cadmium.

The cathode is constituted by a current collector of sintered nickel containing an active substance of nickel hydroxide products and containing at least one hydroxide of cadmium, and/or cobalt, and/or zinc. It may equally well be constituted by a highly-porous current collector of foam, nickel fibers or a foil of nickel or nickel-plated steel which is coated with a paste containing nickel hydroxide products and a polymer binder.

The electrolyte is an aqueous solution of hydroxides, for example of sodium, potassium or lithium, and of their compounds. Preferably, its concentration lies in the range 7N to 9N.

The present invention gives the advantage of simplicity of manufacture and stability throughout the life of the storage cell. Moreover, the recombination system allows charging at a high rate and does not alter the characteristics of the storage cell during discharge at a high rate and/or at low temperature.

Other features and advantages of the present invention will be apparent from the following examples of embodiments, given purely by way of non-limiting example and with reference to the accompanying drawings in which:

FIG. 7 is similar to FIG. 6 for different structures.

Figure 1:
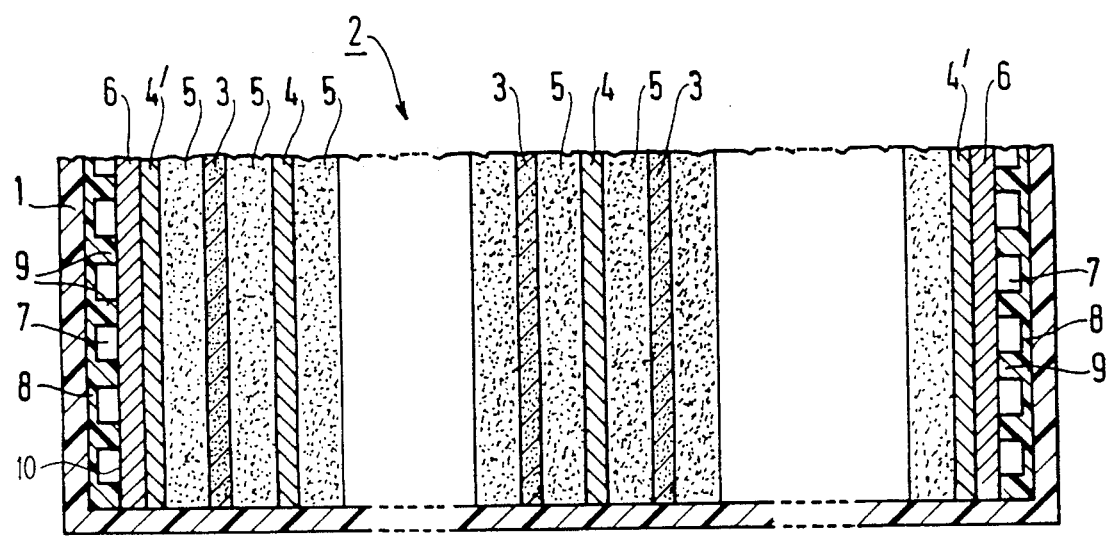
FIG. 1 is a schematic partial section through a cell according to the present invention.

As shown in partial section in FIG. 1, an electrochemical cell according to the invention is composed of a generally rectangular container 1 and a stack 2 comprising a plurality of pairs of electrodes composed of a positive electrode or cathode 3, a negative electrode or anode 4, and a separator 5 impregnated with electrolyte. Placed at the end of the stack is a recombination electrode 6 associated with at least one space 7 formed by inserting a rigid structure which acts as a rigid spacer 8. The recombination electrode 6 is electrically connected to the negative polarity and placed in direct contact with the external negative electrode 4' of the stack 2 of electrodes. The rigid spacer 8 is provided with rigid projections 9 which bear against the face 10 of the recombination electrode 6 opposite to the negative electrode 4', thereby forming a plurality free spaces 7. The stack usually comprises a supplementary negative electrode so that it is flanked by two external negative electrodes 4', each of which is coupled to a recombination electrode 6 associated with a spacer 8.

Figure 2:
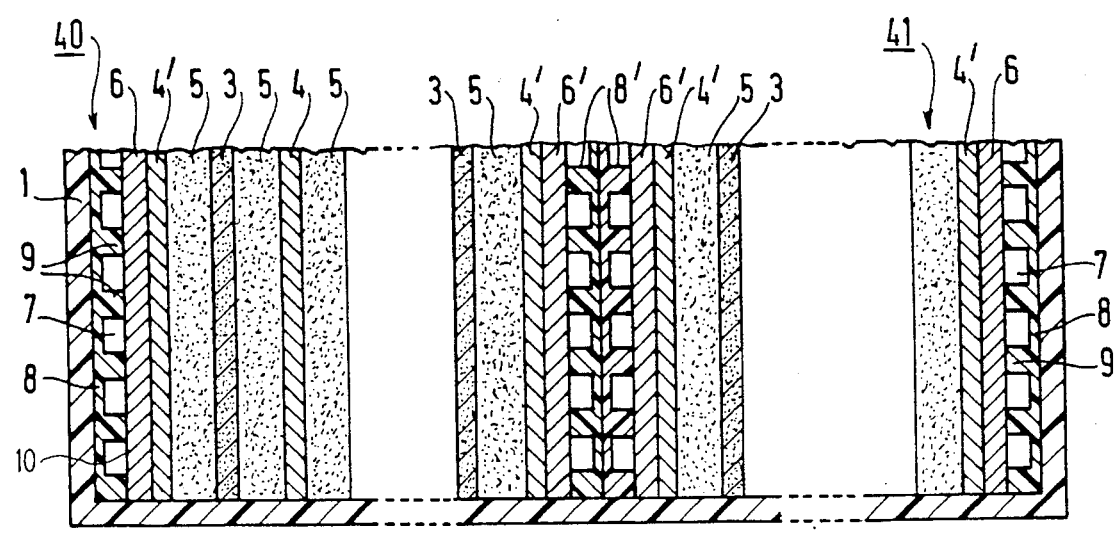
FIG. 2 is a schematic partial section through a variant of the cell according to the invention.

FIG. 2 shows a variant of the cell of the present invention in which the stack of electrodes is divided into a plurality of sub-stacks 40 and 41. Each sub-stack 40 or 41 has external negative electrodes 4' to which the recombination electrodes 6 are coupled. The recombination electrodes 6' situated between two sub-stacks are placed so that their spacers 8' are back-to-back. The assembly constituted by the two rigid spacers 8' may be constructed from a single part provided with projections on both faces.

Figure 3:
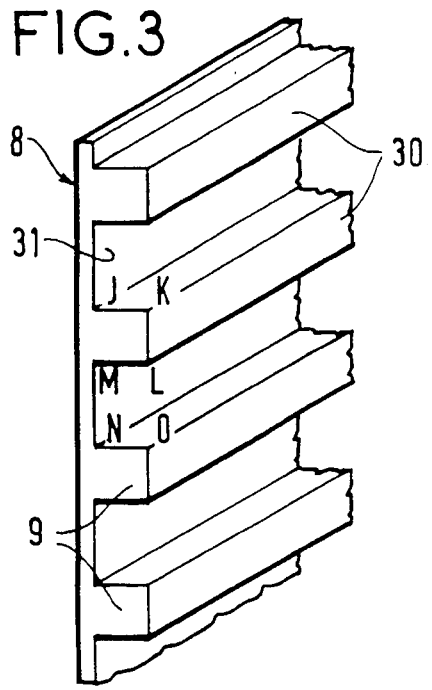
FIG. 3 is a partial enlarged perspective view of the spacer of FIGS. 1 and 2.

An enlarged view of the rigid spacer 8 of FIGS. 1 and 2 is given in FIG. 3. The projections 9 are constituted by ribs of cross-section JKLM and spacing MN. The surface 30 is in contact with the negative electrode 4'. Oxygen circulates in the channels of cross-section LMNO thereby formed, and makes contact with the recombination electrode via the surfaces 31.

Figure 4:
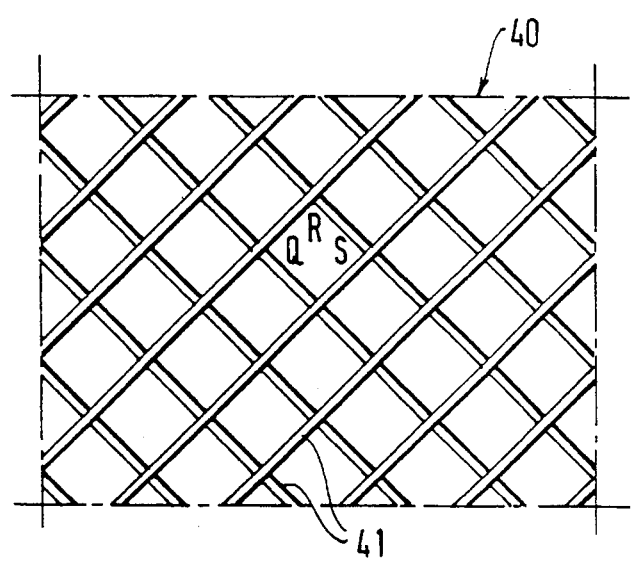
FIG. 4 is a schematic enlarged plan view of a variant of the spacer.

In a variant shown in FIG. 4, the rigid spacer 40 is constituted by a plastics grid of square mesh with sides QR=RS lying in the range 1 mm to 10 mm. The thickness of the strands 41 lies in the range 0.2 mm to 1.5 mm. It is equally possible to use a similar grid with a diamond-shaped mesh. For a cell like that shown in FIG. 2, the spacers 8' associated with the recombination electrodes and situated between two sub-stacks may be constituted by a single grid similar to that of FIG. 4.

Figure 5:
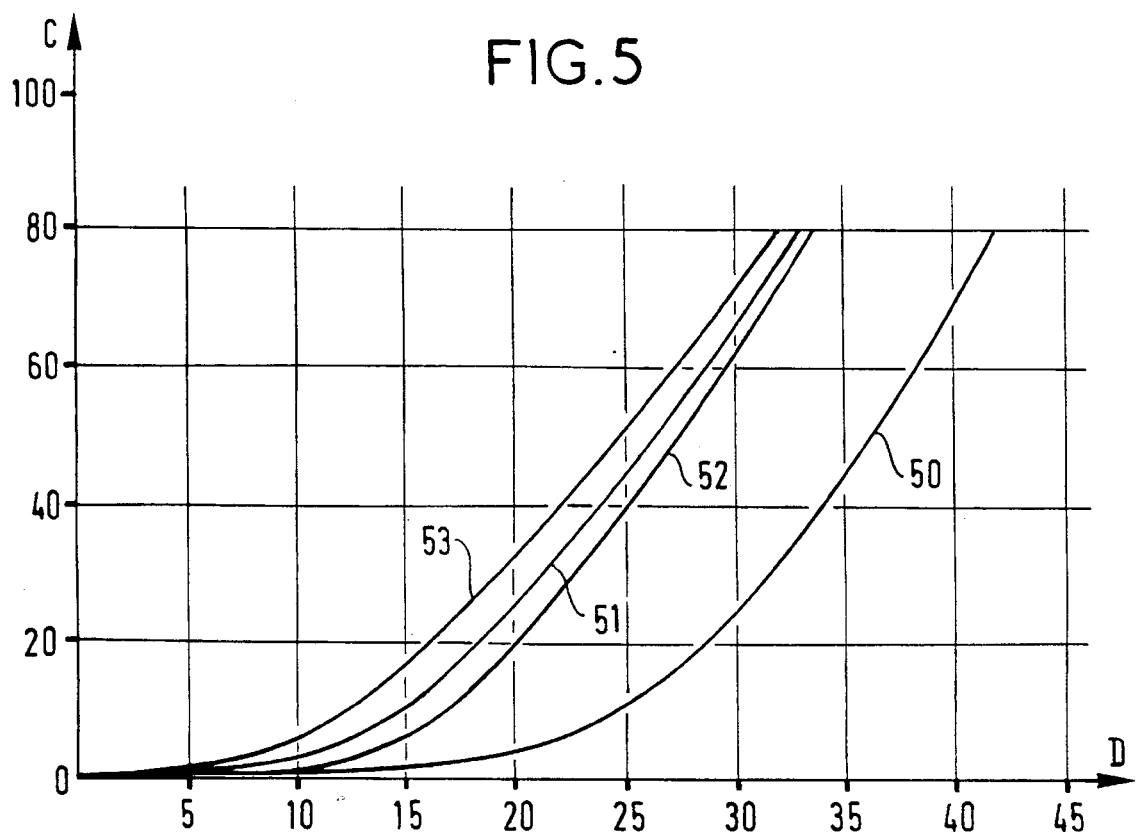
FIG. 5 is a comparison of the deformations D (in %) of a recombination electrode associated with spacers of different constructions as a function of the applied stress C (in $DaN/cm^2$)

Comparing the deformation D of a recombination electrode associated with spacers of different compositions subjected to stress C, as shown in FIG. 5, it can be seen that the deformation D is significant for a felt spacer (curve 50). By contrast, if the spacer has ribs similar to FIG. 3 (curve 51) or is a plastics grid similar to FIG. 4 (curve 52), the deformation is smaller and tends to approach that of an electrode alone (curve 53). The deformation suffered by the recombination system of the present invention during use of the storage cell is manifested by a small diminution or reduction in the free space 7 (of the order of 2%), which does not give rise to significant variations in operation at the usual overcharge rates.

EXAMPLE 1

A storage cell A1 according to the invention of the kind shown in FIG. 1, is composed of a plastics container containing a stack of 5 pairs of electrodes, a supplementary negative electrode, and a recombination system. The electrodes external to the stack have negative polarity.

The positive electrodes are formed from a porous support of sintered nickel incorporating an active substance of nickel hydroxide products.

The negative electrodes are formed from a porous support of sintered nickel incorporating an active substance of cadmium hydroxide products.

Between the positive and negative electrodes is placed a separator constituted by two layers of felt made of polypropylene and impregnated with electrolyte which is an aqueous solution of potassium hydroxide KOH and lithium hydroxide LiOH at a concentration of 7.8N. The quantity of electrolyte introduced into the storage cell corresponds to 95% of the total porosity of the positive and negative electrodes and the separator, augmented by the quantity of electrolyte suitable for the recombination electrode as determined experimentally.

The recombination system is constituted by two recombination electrodes, each associated with a spacer. Each recombination electrode is placed at one end of the stack in contact with the final negative electrode.

The recombination electrode is constituted by a support of nickel foam (3.8 $g/dm^2$) coated with a paste composed of 70% carbon, 20% PTFE and 10% of a polyester-type adhesive to a thickness of about 0.6 $g/dm^2$. The adhesive is added to the carbon which is agitated in suspension in the water, followed by a solution of 60% PTFE whilst maintaining the agitation until the mixture is homogenized. The electrode so produced is dried at 110° C. for a few minutes, then rolled to a thickness of about 0.75 mm, and then finally cut up.

The spacer is a hydrophobic part of polypropylene provided with ribs, like that shown in FIG. 3, the dimensions of which are JK=LM=0.80 mm, KL=1 mm and MN=12 mm.

EXAMPLE 2

By way of comparison, a storage cell A2 is constructed in a similar manner to A1, with the exception of the spacers which are replaced with rectangular blocks filled with polypropylene 1.05 mm in thickness, so as to conserve identical clamping of the block.

EXAMPLE 3

By way of comparison, a storage cell A3 is constructed in a similar manner to A1, with the exception of the recombination electrodes and the spacers, which are replaced by rectangular blocks filled with polypropylene 1.80 mm in thickness, so as to conserve identical clamping of the block.

EXAMPLE 4

The nominal capacity of the storage cells A1, A2 and A3 is 5 Ah.

After several charge and discharge cycles intended to form the electrodes, electrochemical evaluation is undertaken in the following manner: the storage cell is charged at the chosen rate until the pressure stabilizes, this value being called the recombination pressure. The test was performed for charging rates of 0.2 A/Ah (C/5), 0.5 A/Ah (C/2) and 1 A/Ah (C). The results are presented in FIG. 6.

For the storage cell A1 according to the invention, the recombination pressure at the 0.2 A/Ah rate is only 0.3 bars, and is 1.2 bars at the 1 A/Ah rate (curve 60).

By comparison, it is 4 bars (curve 61) at the 0.2 A/Ah rate for storage cell A2 in which the recombination electrode is not associated with a spacer and 5.5 bars at the same rate for storage cell A3 which has no recombination electrode.

These results show clearly the significant improvement brought about by associating a spacer with the recombination electrode.

EXAMPLE 5

A storage cell B1 according to the invention is constructed in a similar manner to that described in example 1, with the exception of the negative electrode which is constituted by a support made of a perforated nickel-plated foil on which is deposited a mixture of cadmium oxide and a polymer binder.

Figure 6:
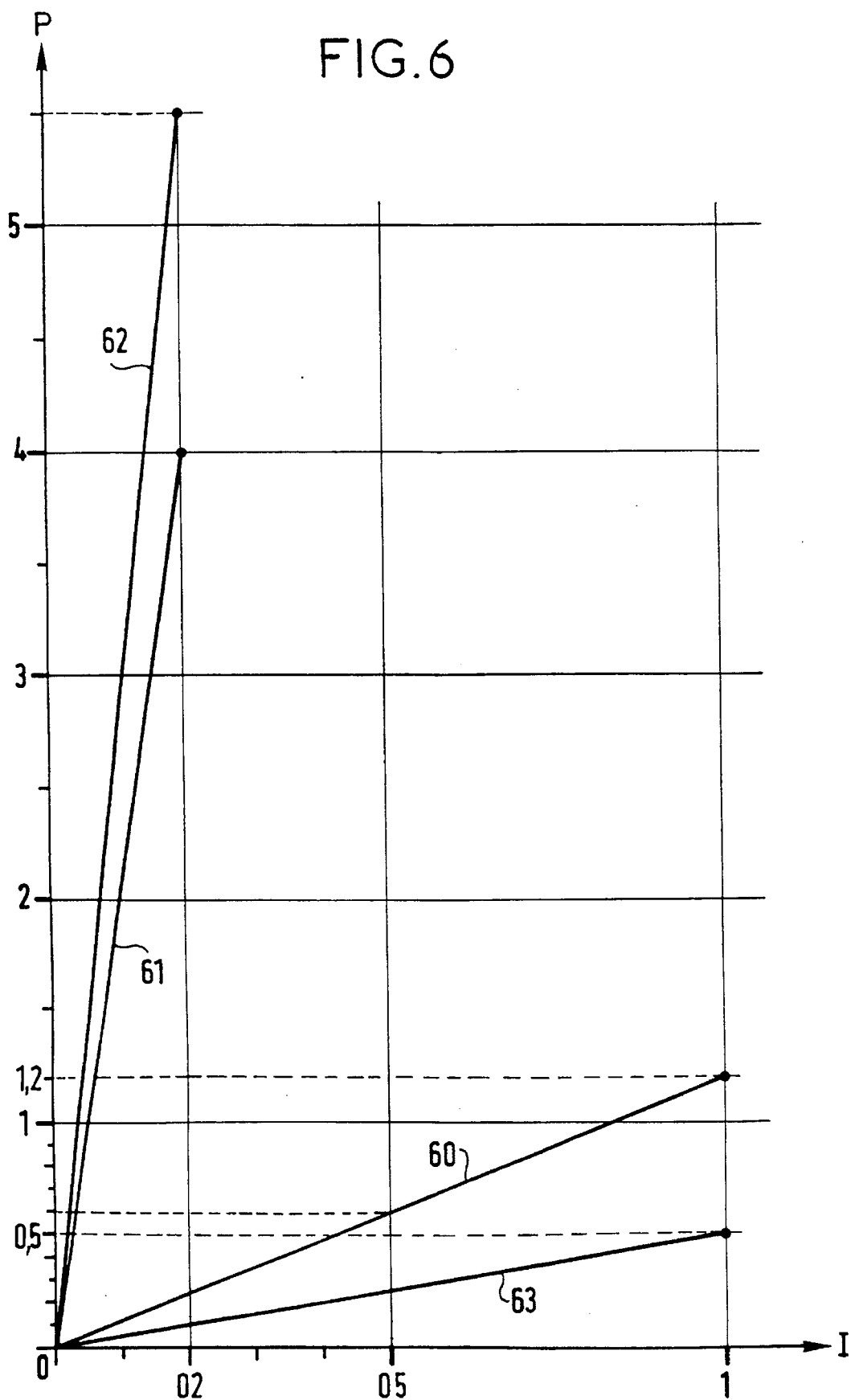
FIG. 6 shows the increase in recombination pressure P (in bars) in a cell according to the invention for different rates I of overcharge (in A/Ah)

Storage cell B1 was evaluated under the same conditions as those given in example 4, and the curve 63 of FIG. 6 obtained. Compared with the recombination pressures measured for storage cell A1 (curve 60), those measured for storage cell B1 (curve 63) show a favorable effect from using the foil technology for the negative electrode.

EXAMPLE 6

Storage cells B1 to B10 according to the invention are constructed in a similar manner to that described in example 5, with the exception of the auxiliary electrode for which a plurality of paste compositions have been tested, as given in Table 1.

Evaluation of the recombination pressures for different overcharge rates was carried under the conditions described in example 4 and the results are listed in Table I.

TABLE I

| Storage cell | Composition of paste (%) | | | Recombination pressure (bars) | | |
| --- | --- | --- | --- | --- | --- | --- |
| | carbon | PTFE | adhesive | 0.2 A/Ah | 0.5 A/Ah | 1 A/Ah |
| B2 | 50 | 40 | 10 | 0.27 | 0.45 | 0.80 |
| B3 | 50 | 25 | 25 | 0.30 | 0.45 | 0.90 |
| B4 | 50 | 10 | 40 | 0.30 | 0.55 | 1.10 |
| B5 | 10 | 50 | 40 | 0.25 | 0.45 | 0.90 |
| B6 | 25 | 50 | 25 | 0.25 | 0.45 | 0.90 |
| B7 | 40 | 50 | 10 | 0.25 | 0.50 | 1.00 |
| B8 | 10 | 40 | 50 | 0.37 | 0.65 | 1.08 |
| B9 | 25 | 25 | 50 | 0.35 | 0.68 | 1.07 |
| B10 | 40 | 10 | 50 | 0.30 | 0.58 | 1.06 |

It is observed that the composition of the paste in the domain studied has a limited influence on the recombination pressure. The access of the gaseous oxygen to the surface of the electrode therefore appears to be the principle factor governing operation of the storage cell at low pressure. This access is preserved by the presence of the spacer.

After each overcharge, the capacity restored by the storage cell was measured at the subsequent discharge at 1 A/Ah, terminating at a voltage of 1 volt. The values of capacity obtained were very similar and varied between 5.2 Ah and 5.5 Ah, which indicated homogeneous operation of the stacks.

EXAMPLE 7

Two storage cells B11 and B12 according to the invention were constructed in a similar manner to that described in example 1, with the exception of the auxiliary electrode which was rolled to a thickness of 0.35 mm and 0.55 mm respectively.

Evaluation of the recombination pressures for different overcharge rates was carried out under the conditions described in example 4, and the results are listed in Table II.

TABLE II

| Storage cell | electrode thickness mm | recombination pressure (bars) | | |
| --- | --- | --- | --- | --- |
| | | 0.2 A/Ah | 0.5 A/Ah | 1 A/Ah |
| B11 | 0.35 | 0.4 | 1.1 | 2.6 |
| B12 | 0.55 | 0.2 | 0.5 | 1.4 |
| B1 (reference) | 0.75 | 0.1 | 0.3 | 1.0 |

It can be seen that the pressure is greater the smaller the thickness of the recombination electrode. In this case, the electrode surface becomes more hydrophobic and no longer allows the formation of the fine films of electrolyte necessary for the formation of three-phase meniscuses, which are centers for the recombination reaction. The pressures obtained are nonetheless always lower than those observed in storage cells without recombination systems.

EXAMPLE 8

Storage cells B13 to B20 according to the invention are constructed in a similar manner to that described in example 5, but comprising 15 pairs of electrodes (capacity 15 Ah) and with the exception of the ribbed spacer, the dimensions of the ribs being variable and given in Table III. It will be noted that the spacer of storage cell B17 has the same dimensions as that of storage cell B1.

TABLE III

| Storage cell | distance between ribs (mm) | thickness of ribs (mm) | FIG. 7 curves No. |
| --- | --- | --- | --- |
| B13 | 3 | 0.80 | 70 and 70' |
| B14 | 5 | 0.80 | 71 and 71' |
| B15 | 5 | 1.00 | 72 and 72' |
| B16 | 5 | 1.20 | 73 and 73' |
| B17 | 12 | 0.80 | 74 and 74' |

Evaluation of the recombination pressures for the overcharging rates of 0.2 A/Ah, 0.5 A/Ah and 1 A/Ah were carried out, under the conditions described in example 4, after 5 cycles and after 2800 cycles to a discharge depth of 15%. The results are represented in FIG. 7 by the curves 70, 71, 72, 73 and 74 after 5 cycles, and the corresponding curves 70', 71', 72', 73' and 74' after 2800 cycles.

It will be noted that after 2800 cycles, the recombination pressures are always slightly lower than those measured after 5 cycles. These results illustrate clearly that the recombination system according to the present invention confers stable performance on the storage cell throughout its duration of use. This is due to the fact that the fine films of electrolyte initially developed at the surface of the recombination electrode do not develop and therefore do not modify the number of three-phase recombination sites.

After each overcharge, the capacity restored by the storage cell was measured at the subsequent discharge at 1 A/Ah terminating at a voltage of 1 volt. The values of capacity obtained were around 17.3 Ah, which indicated homogeneous operation of the stacks.

EXAMPLE 9

A storage cell H1 according to the invention is constructed in a similar manner to that described in example 1, but comprising 11 pairs of electrodes, and with the exception of the separator, which is constituted by three layers of polypropylene felt, and of the negative electrode.

The negative electrode is constituted by a nickel foam support into which is introduced a mixture of a hydridable composition of type ABs and a polymer binder.

EXAMPLE 10

By way of comparison, a storage cell H2 is constructed in a similar manner to H1, with the exception of the recombination electrodes and the spacers, which are replaced by rectangular blocks filled with polypropylene 1.80 mm in thickness, so as to conserve identical clamping of the block.

EXAMPLE 11

The nominal capacity of the storage cells H1 and H2 is 11 Ah. The recombination pressures are measured at a rate of 0.2 A/Ah under the conditions described in example 4 after 5 cycles and after 30 cycles. The results are collected in Table IV.

TABLE IV

| Storage | Recombination pressure (bars) | |
| --- | --- | --- |
| cell | After 5 cycles | After 30 cycles |
| H1 | 0.8 | 0.7 |
| H2 | 3.5 | >5 |

These results show clearly that the recombination pressures are lowered considerably by the presence of the recombination electrode associated with an incompressible space formed by a rigid hydrophobic part.

Whether in the nickel-cadmium storage cells described earlier or in the nickel hydride storage cells above, the presence of the recombination system according to the invention allows operation at low pressure with unchanged performance throughout the duration of use of the storage cell.

The present invention is of course not limited to the embodiments described and shown, but many variants are possible for the person skilled in the art, without departing from the spirit of the invention.

We claim:

1. In combination, a prismatic electrochemical cell having an alkaline electrolyte comprising a stack placed in a container and composed of at least one anode and at least one cathode containing nickel hydroxide, and an oxygen recombination system, said oxygen recombination system comprising at least one recombination electrode which is at least partially hydrophobic and has first and second opposite faces of large surface area, said first face being joined to said anode, and a rigid structure in direct face-to-face contact with the second face of said recombination electrode, and defining therebetween at least one free, nonreducible space of small width so as to allow oxygen access to said recombination electrode throughout the duration of use of said cell, and wherein said recombination electrode is composed of a porous current collector coated with a mixture of carbon, polytetrafluoroethylene, and a bonding agent.

2. A cell according to claim 1, wherein said rigid structure comprises spaced projections defining said at least one free space and in contact with said second face of said recombination electrode.

3. A cell according to claim 2, in which said rigid structure comprises rectilinear ribs.

4. A cell according to claim 2, in which said rigid structure may be an expanded metal, a grid or a gauze.

5. A cell according to claim 1, in which said rigid structure is hydrophobic.

6. A cell according to claim 1, in which said current collector may be a foil, a felt or a foam of nickel.

7. A cell according to claim 1, in which said mixture is composed of 40% by weight of carbon, 20% by weight of PTFE and 10% by weight of a polyester adhesive.

8. A cell according to claim 1, in which said recombination electrode and said rigid structure associated with it are situated at one end of said stack of electrodes.

9. A cell according to claim 8, in which said rigid structure is constituted by projections integral with the internal wall of said container.

10. A cell according to claim 1, in which said at least one recombination electrode comprises two recombination electrodes and a said recombination electrode and a said rigid structure associated with same are situated at each end of said stack of electrodes.

11. A cell according to claim 1, in which said at least one recombination electrode comprises two recombination electrodes and said stack of electrodes is divided into sub-stacks and in which a said recombination electrode and a said rigid structure associated with same are situated at each of the ends of said sub-stacks of electrodes.

12. A cell according to claim 11, in which said two rigid structures are placed back-to-back between two sub-stacks, and are constituted by a single part bearing projections on opposite faces of said single part.

13. A cell according to claim 1, in which said anode contains a hydridable composition.

14. A cell according to claim 1, in which said anode contains cadmium.

15. A cell according to claim 1, in which said electrolyte is an aqueous solution of potassium and lithium hydroxides.

* * * * *